J. CLARK ET AL 1,680,499

WROUGHT METAL CONNECTION FOR THREADED PIPE SECTIONS

Filed March 4, 1924     4 Sheets-Sheet 2

Aug. 14, 1928.  
J. CLARK ET AL  
1,680,499  
WROUGHT METAL CONNECTION FOR THREADED PIPE SECTIONS  
Filed March 4, 1924   4 Sheets-Sheet 3

Aug. 14, 1928.  J. CLARK ET AL  1,680,499

WROUGHT METAL CONNECTION FOR THREADED PIPE SECTIONS

Filed March 4, 1924  4 Sheets-Sheet 4

Patented Aug. 14, 1928. 1,680,499

UNITED STATES PATENT OFFICE.

JAMES CLARK, FRANK N. SMITH, AND JAMES MEESE, OF BRADFORD, PENNSYLVANIA, ASSIGNORS TO S. R. DRESSER MANUFACTURING COMPANY, OF BRADFORD, PENNSYLVANIA, A CORPORATION OF PENNSYLVANIA.

WROUGHT-METAL CONNECTION FOR THREADED-PIPE SECTIONS.

Application filed March 4, 1924. Serial No. 696,811.

Our invention consists in the novel features hereinafter described, reference being had to the accompanying drawings which show several forms in which we have contemplated embodying our invention, selected by us for purposes of illustration and the said invention is fully disclosed in the following description and claims.

The object of our invention is to provide a reinforcing sleeve for threaded end pipe sections for use especially in rivers, swamps and bad places, in pipe lines, for the purpose of relieving the screw threads from injurious strain and for the purpose of insuring an absolutely tight joint and obviating the necessity of future repairs to the pipe line, which might otherwise be required in case of injury to the screw threaded connection. Our invention also contemplates the use of our improved forms of couplings where the connected pipes are disposed angularly with respect to each other and also in cases where it is desirable to effect a connection with a branch pipe or pipe line.

Referring to the accompanying drawings.

Figure 1:
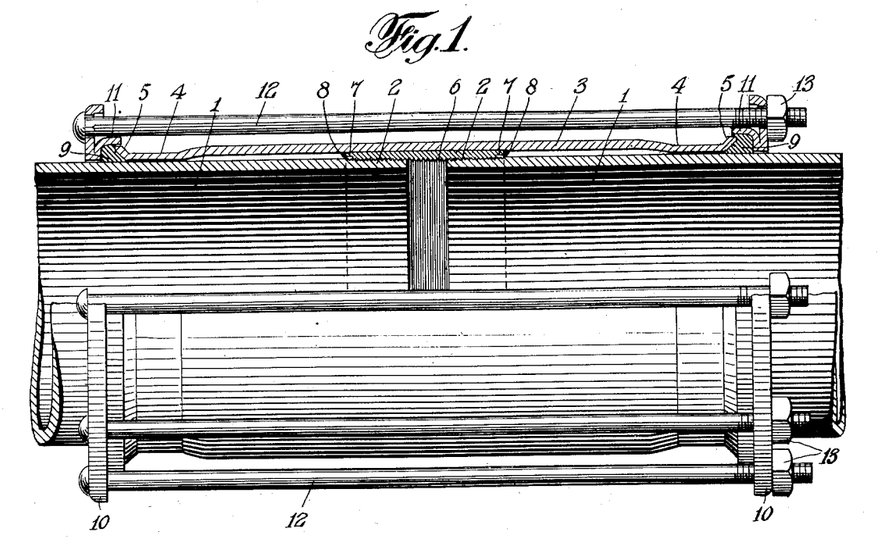
Fig. 1 is a view, partly in section, and partly in elevation, of a coupling sleeve embodying our invention for uniting and reinforcing threaded pipe sections.
Figure 2:
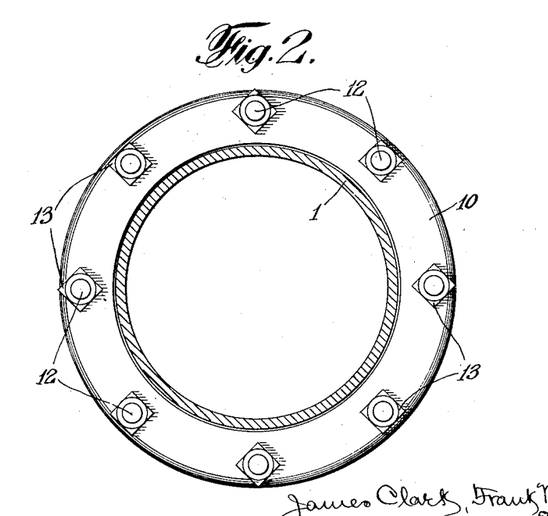
Fig. 2 is an end elevation of the coupling illustrated in Fig. 1.

Referring to Figs. 1 and 2, 1—1 represent two ordinary threaded end pipe sections, which are to be united and form part of a pipe line such as is used for conveying natural gas or other fluid, said sections being provided at each end with an exteriorly threaded portion, 2. Such pipe sections are ordinarily connected by means of a screw collar provided with interior screw threads into which the adjacent ends of the threaded pipe sections are screwed. In the formation of the threaded end portions, 2, on the pipe sections, 1, the threads are cut by means of dies or tools, portions of the metal being removed, and such cutting of threads upon the end portions of the pipe sections necessarily weakens the pipe sections so that when connected by the ordinary screw collar they frequently fracture at one of the grooves between adjacent screw threads at the end of the screw collar, especially where the pipe sections are subjected to lateral strains. Such fractures of the threaded ends of the pipe sections or the splitting of the screw collar, render the coupling of the sections by means of the screw collar useless with the result that leaks occur which are difficult and expensive to repair. Where pipe lines are laid in river beds through swamp land and other localities, where the pipe joints are very inaccessible and where the pipe lines are subjected to severe lateral stress due to the character of the soil in which they are laid, which may permit the line to sag and exert a bending strain on the connected pipe sections, and where, through the heaving of the soil by frost, or in any other way, the pipe line is likely to be disturbed so as to produce lateral strains, the ordinary pipe collars do not afford a permanent and reliable coupling for the threaded pipe sections, and it has been found necessary and extremely desirable to connect such pipe sections by means which will reinforce the threaded connections of the pipes so as to guard against fracture of the exteriorly threaded end portions and also to provide means for insuring an absolutely tight joint even if such fractures should occur so as to avoid the loss, expense and labor which may otherwise be required for the replacing or repair of a broken pipe section.

In carrying out our invention we employ a long coupling sleeve, 3, of considerably greater length than the ordinary screw collar, formed preferably of wrought metal and having its main body of cylindrical form and of greater internal diameter than the external diameter of the pipe sections, 1, to be connected. Adjacent to each end, 2, the sleeve, 3, is preferably provided with a reduced portion, indicated at 4, which substantially fits around the exterior of the pipe sections, 1—1, certain clearance being allowed, sufficient to accommodate ordinary surface irregularities and variations in commercial pipe. Beyond the reduced portions, 4, which we term the pipe engaging portions, to distinguish them from the enlarged interior central portion of the sleeve, the end portions of the sleeve are flared outwardly, as indicated at 5, to form annular flanges providing conical packing recesses between said flanges, 5, and the exterior of the pipe sections. The sleeve, 3, is provided internally with separately formed internally threaded annular portions secured to the sleeve, preferably by welding, into which the threaded portions, 2, of adjacent pipe sections may be firmly screwed. These internally threaded connecting portions of the sleeve may be formed in one piece, or in two pieces separately united by welding to the interior surface of the enlarged portion of the sleeve, as may be preferred. In Fig. 1 we have shown an internally threaded collar, 6, formed in one piece of wrought metal and provided at each end with a recessed portion, 7, on its interior, the interior screw threads extending from one recess, 7, to or substantially to the center of the collar. The collar, 6, is welded to the interior of the enlarged portion of the sleeve, 3, and this welding operation is preferably performed by means of the well known electric welding machine, by the use of a welding rod which forms a fillet, indicated at 8 at each end of the collar, 6. By reason of the recesses, 7—7, the internal diameter of the collar, 6, at each end is greater than the internal diameter of the threaded portion, and the fillets, 8—8, will unite these reduced end faces of the collar to the interior surface of the sleeve, 3, so that the fillets will not interfere with the insertion of the threaded ends of the pipe sections in the collar, 6. In the manufacture of the sleeve, one end may be heated and pressed in suitable dies to form the reduced pipe engaging portion, and the flaring marginal portion adjacent thereto. The collar may then be inserted in the unreduced end of the sleeve and welded therein, after which the other end of the sleeve may be shaped in a similar manner, to produce the pipe engaging portion and flaring marginal portion thereof. It will be noted that the welding of the interior collar, 6, within the sleeve, 3, effects a reinforcement of both the collar and sleeve and the joint is further reinforced by the engagement of the pipe sections with the reduced portions, 4, of the sleeve at a distance from the threaded connections which assists in maintaining the pipe sections in proper axial relation with each other and to relieve the threaded connections from lateral strain. Annular packing rings, 9, which are preferably formed of rubber or other suitable compressible material, are provided at each end of the sleeve, said packing rings having conical portions which fit into the conical packing recesses and being also provided with enlarged portions to engage clamping rings, 10, also preferably formed of wrought metal. Each of these clamping rings comprises a plate member having an annular series of bolt holes therein and an annular flange member, 11, forming a packing recess to engage the exterior portions of the packing rings, these annular flange members being of such diameter that they will pass outside of the end flanges, 5, of the sleeve, as indicated in the drawings. These clamping rings are drawn toward the ends of the sleeve, 3, to compress the packings longitudinally and transversely between the flanges, 5, and the exterior surface of the pipes, by means of bolts, 12, which, as shown in Fig. 1, extend from one clamping ring to the other through the registering bolt holes therein, and are provided with clamping nuts, indicated at 13. In some instances, however, as hereinafter described, we may employ anchor flanges secured to the sleeve adjacent to each end thereof and connect the clamping rings to said anchor flanges by short bolts at each end of the coupling. When the clamping bolts and nuts are drawn up and the packing rings compressed, said rings form a perfectly tight joint with the ends of the sleeve, 3, and the exterior of the pipe sections independent of the screw threaded joints formed between the threaded portions of the pipe ends and the interior collar, 6. These packed joints at each end of the sleeve tend to further reinforce the structure of the entire joint and to hold the pipe sections against lateral movement and strain which would tend to fracture the threaded portions thereof, while, in case the central screw threaded connections between the pipe ends and collar, 6, should leak, or the pipe ends become fractured, no fluid could escape from the pipe line at such points by reason of the packed joints at the opposite ends of the sleeve. These couplings, therefore, reinforce the screw threaded connections against fracture of the collar, 6, and threaded pipe ends, and also insure positively against any possible leakage in case of leakage at or injury to the parts of the interior threaded joints.

Figure 3:
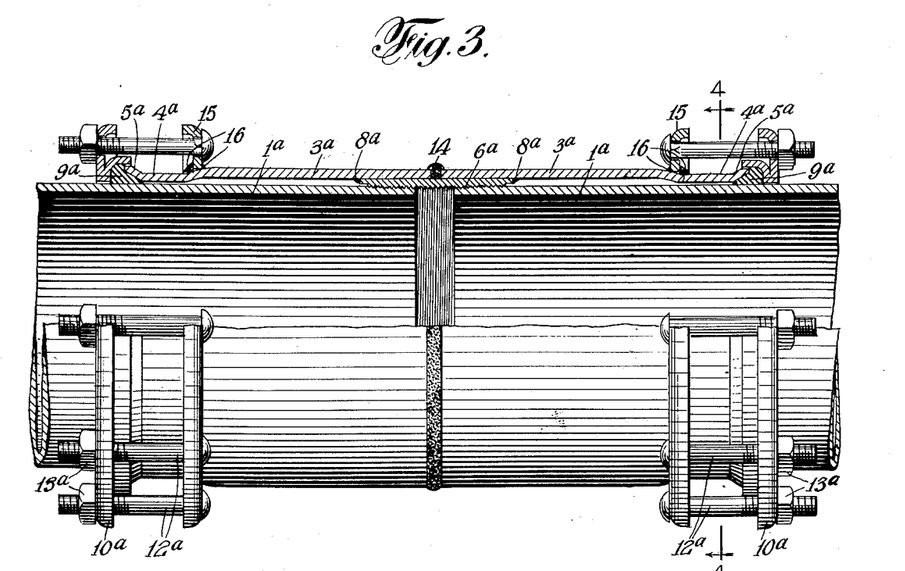
Fig. 3 is a view similar to Fig. 1 showing a slightly modified construction in which the reinforcing sleeve is formed in two parts and united by welding, and in which the clamping rings are secured by short bolts connected to anchor flanges secured to the exterior of the sleeve.
Figure 4:
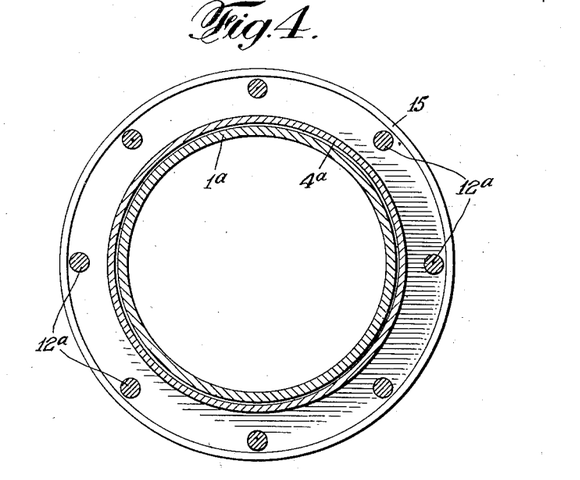
Fig. 4 represents a section through one end of the coupling on the line 4—4 of Fig. 3.
Figure 5:
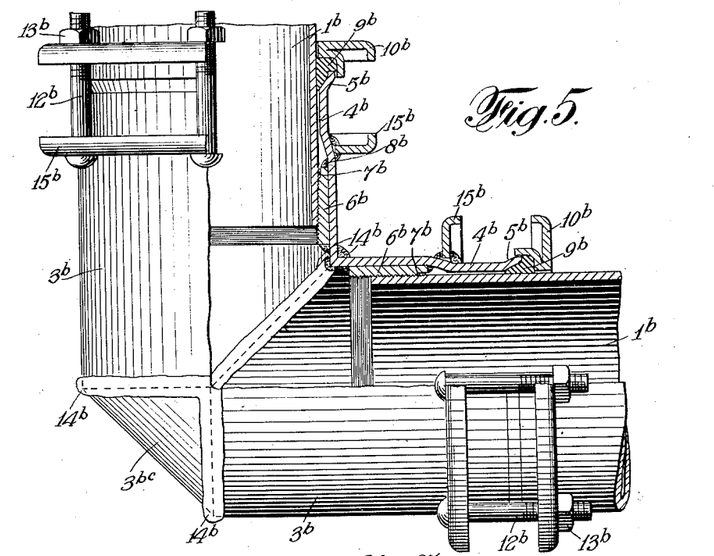
Fig. 5 is an elevation, partly in section, of a further modification in which the sleeve is formed so as to provide portions disposed angularly with respect to each other.

In Figs. 3 and 4 we have shown a slight modification of our invention in which the sleeve, indicated at 3ª, while of the same general form as that shown in Fig. 1, is formed in two parts divided transversely and centrally of its length, each of the sleeve sections being provided at its outer end with a reduced pipe engaging portion, 4ª, and packing engaging flange, 5ª. The inner ends of the sleeve sections are united preferably by welding, as indicated at 14, the welding operation being preferably performed by an electric welding machine and welding rod forming a fillet, connecting the inner ends of the sleeve sections, 3ª, together. In this case the threaded collar, 6ª, is formed in one piece and welded on the interior of the sleeve so that the fillet, 14, is located substantially at the middle of the threaded collar, 6ª, the collar being preferably electrically welded at its end portions, as heretofore described, and the fillets, 8ª, being formed at either end as in Fig. 1, and the collar, 6ª, being internally screw threaded to receive the threaded end of the pipe sections, 1ª. In this instance the collar, 6ª, performs an additional function in that it reinforces the welded joint between the sections, 3ª—3ª, so that the welded sleeve is quite as strong as the sleeve shown in Fig. 1, formed integrally. In uniting the two parts of the sleeve with the collar, we prefer to place the collar in position within the meeting portions of the sleeve sections, the latter being slightly separated so that the fillet, 14, will be welded not only to the two meeting ends of the sleeve, but also to the central portion of the collar, as clearly shown in Fig. 3. This unites the collar to the sleeve at its ends and also in the center, and further results in strengthening the structure. As shown in Fig 3, the sleeve is provided at each end with packings, 9ª, and clamping rings, 10ª, which are held in position by bolts, 12ª, and nuts, 13ª. We may employ long bolts extending from one clamping ring to the other, as in Fig. 1, or as before stated, we may employ anchor flanges and short bolts from each anchor flange to the adjacent clamping ring, as shown in Fig. 3. In this figure, 15, represents the anchor flange which comprises an annular plate member provided at its outer end with a reinforcing flange, and having a circular series of bolt holes registering with those in the clamping ring, 10ª, the anchor flanges being welded to the exterior of the sleeve adjacent to the inner ends of the reduced portions, 4ª, and being preferably welded by means of the electric welding machine and welding rod, so as to form fillets, indicated at 16, on opposite sides of the anchor flange, uniting it with the sleeve. It will be understood that either the type of sleeve shown in Fig. 3 or in Fig. 6 may be made with or without the anchor flanges, 15, according as it is desirable to employ the long bolts, 12, or the short bolts, 12ª, at each end of the coupling.

Where the pipe sections to be connected are so disposed that their longitudinal axes are at an angle to each other, we provide a modified form of coupling sleeve, illustrated in Fig. 5, for example, having its opposite end portions disposed with their axes at the desired angle to each other, and in this case the internally threaded portions, instead of being formed in one piece as in Figs. 1 and 3, will be formed in two sections and separately welded in the sleeve within the portions thereof of greatest diameter. In this figure, we have shown the coupling arranged to connect pipe sections indicated at 1ᵇ, having their axes disposed perpendicularly to each other, but they may be united at any desired angle. The sleeve is formed in this instance in three sections, 3ᵇ, 3ᵇ, 3ᵇᶜ, suitably mitred, so that they can be fitted together closely, said sections being united by welding them on the electric welding machine by the aid of a welding rod and forming either upon the interior or upon the exterior, or both, fillets, 14ᵇ, uniting the sections rigidly. This angular sleeve is provided adjacent to each end with the reduced pipe engaging portion, 4ᵇ, and packing engaging flange, 5ᵇ, packing ring, 9ᵇ, clamping ring, 10ᵇ, anchor flange, 15ᵇ, constructed exactly as hereinbefore described with reference to the preceding figures. Within each tubular section, 3ᵇ, is a threaded ring section, indicated at 6ᵇ, which is constructed exactly like one half of the threaded ring, 6ª, heretofore described, the outer ends of the ring sections, 6ᵇ, being internally recessed, as shown at 7ᵇ, each ring being held in place by fillets, 8ᵇ. It is unnecessary to provide the recess at the inner ends of these ring sections, 6ᵇ, as the pipe sections, 1ᵇ, do not ordinarily extend entirely through the ring sections, as indicated in Fig. 5. The clamping rings are united to the anchor flanges in this instance by short bolts, 12ᵇ, and nuts, 13ᵇ, in substantially the same manner as indicated in Figs. 3 and 4. It will be obvious that in case of any leakage at the threaded connections between the pipes and interior threaded collars the coupling will nevertheless be maintained absolutely tight by the packing rings, 9ᵇ, and their clamping rings.

Figure 6:
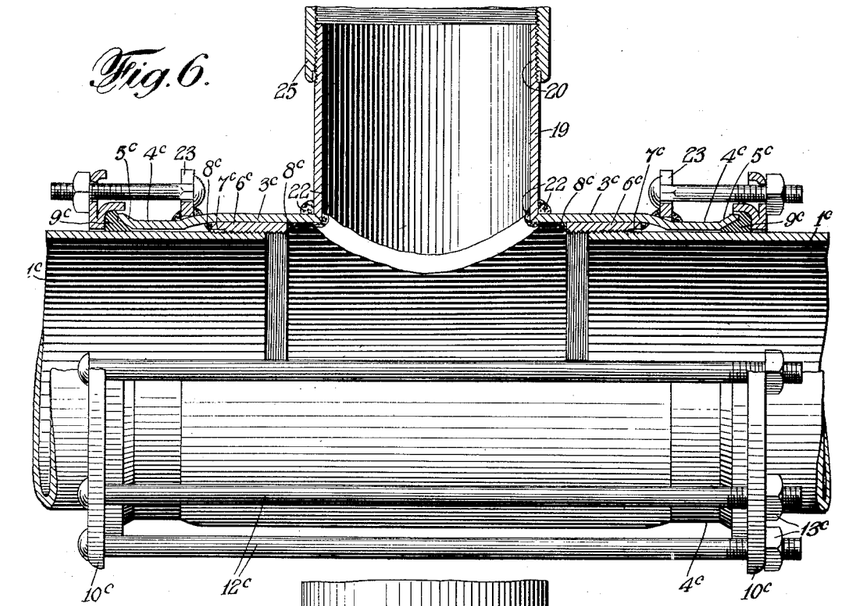
Fig. 6 is a similar view of another modification of our invention, in which the sleeve is provided with a branch pipe having its end threaded to receive an ordinary pipe collar, the interior threaded pipe engaging portion of the sleeve being formed in two parts and located on opposite sides of the branch connection.
Figure 7:
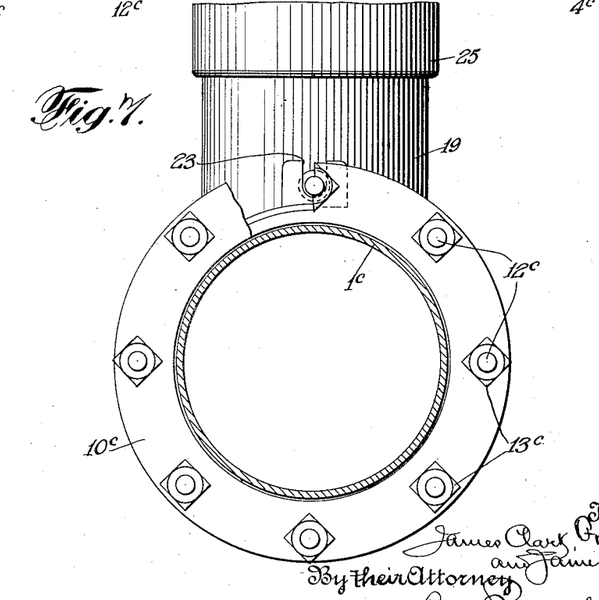
Fig. 7 is an end view of the coupling illustrated in Fig. 6.

In some instances it is desirable to take off a lateral branch pipe at an angle to the main line, and we have shown in Figs. 6 and 7, one construction for accomplishing this result. In this figure, 1ᶜ—1ᶜ, represent the main line pipe sections to be connected. 3ᶜ represents the sleeve, which is formed exactly as heretofore described and illustrated in Fig. 1, with the exception that an aperture, 18, is formed on one side of the sleeve, into which is fitted a branch pipe, indicated at 19, which in this instance has its outer end externally threaded, as shown at 20, so that it can be readily connected by means of an ordinary screw collar, 21, with the next adjacent pipe section of the branch line. The branch pipe, 19, is fitted to the aperture, 18, and is secured to the sleeve, 3ᶜ, by welding, preferably on the electric welding machine, and by the use of a welding rod, fillets, 22, being formed preferably both inside and outside of the sleeve following the joint between the branch pipe and sleeve, and rigidly uniting the branch pipe to the sleeve. In this instance the internally threaded portion of the sleeve is formed in two sections, indicated at 6ᶜ—6ᶜ, and constructed in the same manner as described and shown with reference to Fig. 5, said collar sections being welded into the interior of the sleeve, 3ᶜ, within the portion of enlarged diameter thereof, preferably on the welding machine, by the use of a welding rod, and the formation of fillets, 8ᶜ—8ᶜ. These collar sections, 6ᶜ, will preferably be provided at their outer ends with the internally recessed portion, 7ᶜ, as shown. The outer ends of the sleeve, 3ᶜ, are provided with the reduced portions, 4ᶜ, packing engaging flanges, 5ᶜ, packings, 9ᶜ, and clamping rings, 10ᶜ, all constructed and operating as hereinbefore described. It is obvious that the sleeve could be provided with long bolts directly connecting the clamping flanges, 10ᶜ, as shown, in Fig. 1, or the sleeve will be provided with anchor flanges, as in Figs. 3 and 5, and with short bolts connecting the anchor flanges to the adjacent clamping flanges. Where the long bolts, as indicated at 12ᶜ, are employed, it is obvious that it would be impossible to run a bolt from one flange, 10ᶜ, to the other directly in line with the branch pipe, 19, and where it is desirable to have a bolt in this location in order to properly distrubute the bolt strain around the circle of the clamping rings, 10ᶜ, we may provide one or more anchor lugs, 23, as indicated in Figs. 6 and 7, welded to the end portions of the sleeve and provided each with a bolt hole or with an open slot of sufficient size to accommodate the bolt and located in alignment with a bolt hole of the adjacent clamping ring, 10ᶜ. Obviously if the sleeve is provided with an anchor ring at each end, these lugs would not be used.

Figure 8:
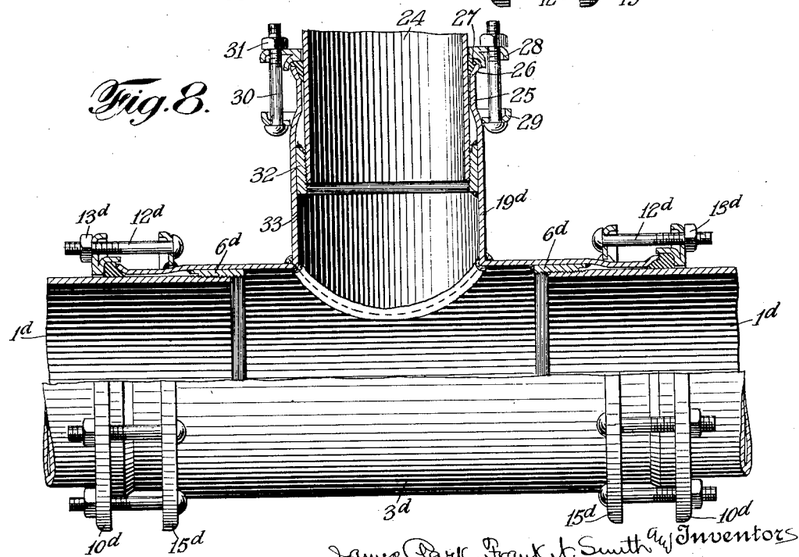
Fig. 8 is an elevation, partly in section showing a further modification of our invention in which the sleeve is provided with a lateral branch having internal threaded portions and means for compressing an annular packing upon the exterior of the adjacent pipe section of the branch line.

In Fig. 8 we have shown a further modification of our invention, in which the sleeve, indicated at 3ᵈ, is provided with a branch pipe, 19ᵈ, of larger internal diameter than the external diameter of the adjacent threaded pipe, 24, to be connected with the branch, the outer end portion of the branch pipe being provided with a portion of reduced diameter, indicated at 25, and a packing engaging flange, 26, to receive a packing, 27, surrounding the branch pipe section, 24, the packing ring, 27, being engaged by a clamping ring, 28, which is secured to an anchor ring, 29, (welded to the branch pipe, 19ᵈ), by means of short bolts, 30, and nuts, 31. The branch pipe, 19ᵈ, is provided within a portion thereof of greater internal diameter with a threaded collar section, 32, welded to the interior of the branch pipe, (preferably by means of the electric welding machine and the formation of fillets, 33) to receive the threaded end of the branch pipe, 24. The other portions of the sleeve 3ᵈ, are constructed exactly as hereinbefore described and illustrated in Figs. 6 and 7, and are indicated by the same reference numerals with the addition of the letter "d" thereto, except that in Fig. 8 the sleeve is shown as provided with anchor flanges, 15ᵈ, and short bolts, 12ᵈ, and nuts, 13ᵈ, connecting the clamping rings, 10ᵈ, with the anchor flanges. The pipe sections of the main pipe line, indicated at 1ᵈ, are screwed into the collar sections, indicated at 6ᵈ, and located on opposite sides of the branch pipe, while the compressed packings at the opposite ends of the sleeve, 3ᵈ, and at the outer end of the branch pipe, 19ᵈ, preclude the possibility of leakage in case of leaks at the screw threaded connections between the pipes 1ᵈ and the main sleeve, or between the branch line pipe, 24, and the branch 19ᵈ.

It will be understood that our improved pipe coupling in whatever form it is manufactured will preferably be constructed entirely of wrought metal so that all parts thereof are entirely free from cracks, porosities, sand holes, etc., which are often present in the construction of cast iron parts. By making our couplings of wrought metal we are able to make them thinner and very much lighter than they would have to be if cast metal were employed, and we are also able to unite the separately formed parts by welding and preferably by electric welding and the use of a welding rod, whereby connecting fillets are formed and rigidly unite the several parts.

The forms of our invention illustrated in Figs. 5, 6, 7 and 8, are not specifically claimed herein, as they form the subject matter of a divisional application, filed August 12th, 1926, and given Serial No. 128,768.

What we claim and desire to secure by Letters Patent is:—

1. A wrought metal connection for threaded pipes, comprising among its members a wrought metal cylindrical member provided at its outer end with an outwardly flared marginal portion, forming a packing recess between it and the unthreaded exterior of a pipe section to be connected therewith, said cylindrical member being provided within the same at a distance from said marginal portion and packing recess with a wrought metal collar fitting the interior of said cylindrical member, united permanently thereto by welding, and internally threaded to receive the terminal threaded portion of the said pipe section.

2. A wrought metal connection for threaded pipes, comprising among its members a cylindrical member of wrought metal provided at at least one end with a pipe aperture adapted to substantially fit around an unthreaded portion of the pipe section to be connected therewith, and provided with outwardly flared marginal portions forming a packing recess to receive an annular compressible packing, a separately formed internally threaded collar of wrought metal adapted to receive the threaded end portion of said pipe section, the said collar fitting the interior of the cylindrical member and being permanently united thereto by welding at a point separated from the pipe engaging portion, whereby the pipe engaging portion of said cylindrical member prevents lateral deflection of the pipe section with respect to the threaded collar, and relieves the engaged threads of the collar and pipe section from strain.

3. A wrought metal connection for threaded pipes, comprising a wrought metal sleeve, having pipe engaging portions adjacent to its ends adapted to substantially fit unthreaded portions of pipe sections to be connected, said sleeve having portions between the pipe engaging portions of greater internal diameter, and having marginal portions at each end flared outwardly from said pipe engaging portions, to form packing recesses for compressible packing between said flared portions and the exterior unthreaded portions of the pipe section, said sleeve being provided within its portions of greater internal diameter with separately formed internally threaded wrought metal portions welded to the sleeve for engaging the threaded portions of the pipe sections to be connected.

4. A wrought metal connection for threaded pipes, comprising among its members an integral wrought metal cylindrical member provided adjacent to an end thereof, with a pipe engaging portion substantially fitting the unthreaded portion of the pipe section to be connected therewith, and a separately formed collar member of wrought metal welded to the interior of the said cylindrical member at a distance from said pipe engaging portion, and threaded internally to engage the threaded end of said pipe section, whereby the said pipe engaging portion of said cylindrical member will relieve the engaged threads of said collar and pipe section from strain.

5. A wrought metal connection for threaded pipes, comprising among its members a wrought metal sleeve having pipe engaging portions adjacent to each end substantially fitting the unthreaded portions of the pipe sections to be connected thereby, said sleeve being provided with separate formed internally threaded portions of wrought metal welded within said sleeve at a distance from the pipe engaging portions for engaging and connecting the threaded end portions of adjacent pipe sections, whereby the said pipe engaging portions will hold said pipe sections against movement with respect to each other, and relieve the engaged threaded portions of the pipe sections and said internally threaded portions of the sleeve from strain.

6. A wrought metal connection for threaded pipes, comprising among its members a wrought metal sleeve having pipe engaging portions adjacent to each end substantially fitting the unthreaded portions of the pipe sections to be connected, and a separately formed collar of wrought metal within said sleeve and permanently welded therein, said collar having interior threaded portions to engage the threaded ends of the pipe sections to be connected, said sleeve having at each end outwardly flared marginal portions forming packing recesses between them and the exterior of unthreaded portions of said pipe sections, and adapted to receive compressible packings.

7. A wrought metal connection for threaded pipes, comprising among its members a wrought metal sleeve having adjacent to each end cylindrical pipe engaging portions substantially fitting the unthreaded portions of the pipe sections to be connected, and having cylindrical portions of greater diameter between said pipe engaging portions, said sleeve being provided at each end beyond the pipe engaging portions with outwardly flared marginal portions forming packing recesses between them and the exterior unthreaded portion of the adjacent pipe section, and a separately formed internally threaded collar of wrought metal fitting the interior of the portions of the sleeve of greater diameter and permanently welded thereto, the threaded portions of the collar being adapted to engage the threaded end portions of the pipe sections to be connected.

8. A wrought metal connection for threaded pipes, comprising among its members a wrought metal sleeve, having a central portion of greater internal diameter than the exterior diameter of the pipes to be connected, and provided at each end with pipe engaging portions of reduced diameter substantially fitting said pipes, and with outwardly flared marginal portions forming packing recesses, said sleeve being formed of two sections having their meeting edges in a plane disposed transversely with respect to the axis of the sleeve and extending through the portion of greater internal diameter, and a wrought metal interiorly threaded collar located within the portion of the sleeve of greater internal diameter, and extending on opposite sides of the plane of the meeting edges of the sleeve sections, said collar being permanently united to the sleeve sections by welding.

9. A wrought metal connection for threaded pipes, comprising among its members a wrought metal sleeve, having a central portion of greater internal diameter than the exterior diameter of the pipes to be connected, and provided at each end with pipe engaging portions of reduced diameter substantially fitting said pipes, and with outwardly flared marginal portions forming packing recesses, said sleeve being formed of two sections having their meeting edges in a plane disposed transversely with respect to the axis of the sleeve, and extending through the portion of greater internal diameter, and a wrought metal interiorly threaded collar located within the portion of the sleeve of greater internal diameter, and extending on opposite sides of the plane of the meeting edges of the sleeve sections, the meeting edges of said sleeve sections being welded together and to the central portion of the sleeve, and the end portions of said collar being welded to said sleeve sections on opposite sides of the plane of the meeting edges of said sleeve sections, whereby the collar unites and reinforces said sleeve section.

10. A wrought metal connection for threaded pipes, comprising among its members a wrought metal cylindrical member provided with pipe engaging portions substantially fitting the unthreaded exterior of a pipe section, and having a portion of greater diameter, and outwardly flared marginal portions adjacent to the pipe engaging portions forming a packing recess between them and the unthreaded portion of the pipe section, an internally threaded wrought metal collar fitting the portion of greater diameter of said cylindrical member formed separately therefrom, and permanently united thereto by welding, an annular compressible packing in said recess, a clamping member for said packing provided with bolt holes and nuts for drawing said clamping member in a direction toward said cylindrical member, and compressing said packing.

11. A wrought metal connection for threaded pipes, comprising among its members a wrought metal cylindrical member provided with pipe engaging portions substantially fitting the unthreaded exterior of a pipe section, and having a portion of greater diameter, and outwardly flared marginal portions adjacent to the pipe engaging portions forming a packing recess between them and the unthreaded portion of the pipe section, an internally threaded wrought metal collar fitting the portion of greater diameter of said cylindrical member formed separately therefrom, and permanently united thereto by welding, an annular compressible packing in said recess, a clamping member for said packing provided with bolt holes, anchoring means formed of wrought metal, welded to the exterior of said cylindrical member adjacent to the pipe engaging portion thereof, and provided with bolt holes and bolts, and nuts for withdrawing said clamping member in a direction toward said anchoring means, and compressing said packing.

12. A wrought metal connection for threaded pipe sections, comprising among its members a wrought metal sleeve provided adjacent to each end with pipe engaging portions substantially fitting the unthreaded portions of the pipe sections to be connected, and having at each end outwardly flared marginal portions forming annular packing recesses, said sleeve being provided with portions of greater diameter between the pipe engaging portions, a separately formed wrought metal collar fitting the interior of the portion of greater diameter of said sleeve, and threaded internally to receive the threaded ends of two adjacent pipe sections, said collar being permanently united to said sleeve by welding, packings engaging said annular packing recesses, clamping rings for engaging said packings, provided with bolt holes, and bolts engaging said bolt holes in the clamping rings, and provided with nuts for drawing said clamping rings toward the adjacent ends of the sleeve to compress said packings.

13. A wrought metal connection for threaded pipe sections, comprising among its members a wrought metal sleeve provided adjacent to each end with pipe engaging portions substantially fitting the unthreaded portions of the pipe sections to be connected, and having at each end outwardly flared marginal portions forming annular packing recesses, said sleeve being provided with portions of greater diameter between the pipe engaging portions, a separately formed wrought metal collar fitting the interior of the portion of greater diameter of said sleeve, and threaded internally to receive the threaded ends of two adjacent pipe sections, said collar being permanently united to said sleeve by welding, packings engaging said annular packing recesses, clamping rings for engaging said packings, provided with bolt holes annularly arranged, anchoring means of wrought metal welded to the exterior of said sleeve adjacent to each end thereof, and provided with bolt holes registering with those in the adjacent clamping member, bolts for connecting each clamping member with the adjacent anchoring means, and provided with nuts for effecting the compression of said packings.

In testimony whereof we affix our signatures.

JAMES CLARK.
FRANK N. SMITH.
JAMES MEESE.